United States Patent [19]

Matsumoto et al.

[11] 4,025,950
[45] May 24, 1977

[54] SAMPLING VIDEO COMPRESSION SYSTEM

[75] Inventors: Yutaka Matsumoto, San Jose; Henry Lum, Palo Alto, both of Calif.

[73] Assignee: The United States of America as represented by the Administrator of the National Aeronautics and Space Administration, Washington, D.C.

[22] Filed: May 27, 1976

[21] Appl. No.: 690,815

[52] U.S. Cl. ................................ 358/133; 358/138
[51] Int. Cl.² ........................................ H04N 7/12
[58] Field of Search ........................... 178/6, DIG. 3

[56] References Cited
UNITED STATES PATENTS 3,769,452  10/1973  Stone ............................ 178/DIG. 3

Primary Examiner—Richard Murray
Attorney, Agent, or Firm—Darrell G. Brekke; John R. Manning

[57] ABSTRACT

A picture transmission system for transmitting a video signal of compressed bandwidth in which the transmitting station is provided with circuitry for dividing a picture to be transmitted into a plurality of blocks containing a checkerboard pattern of picture elements and regularly sampling video signals along corresponding diagonal rows of picture elements in the respective blocks, and a transmitter responsive to the output of the sampling circuitry for transmitting the sampled video signals of one frame at a reduced bandwidth over a communication channel; and in which the receiving station is provided with a frame memory for temporarily storing transmitted video signals of one frame, and circuitry for playing back the video signals of one frame at the original high bandwidth frequency.

9 Claims, 4 Drawing Figures

SAMPLING VIDEO COMPRESSION SYSTEM

ORIGIN OF THE INVENTION

The invention described herein was made by employees of the United States Government and may be manufactured and used by or for the Government for governmental purposes with out the payment of any royalties thereon or therefor.

BACKGROUND OF THE INVENTION

1. Field of the Invention:

The present invention relates generally to a picture transmission system, and more particularly to such a system for transmitting a video signal of compressed bandwidth over a communication channel and for receiving and processing the transmitted video signal.

2. Description of the Prior Art:

Transmission of video data at reduced bandwidths has been the aim of many researchers in Government and private industry. Ideally, this reduction would come from the discovery and elimination of redundancy in the image. Practically, the data rate reduction comes at the expense of picture quality since identifying and coding the redundant parts of an image are rather complex tasks. This invention is primarily involved with the transmission of video data at a reduced data rate by first dividing. the picture into discrete picture elements and then sending these picture elements at a reduced data rate. This method of sending specific picture elements at a reduced data rate has been investigated by other researchers. U.S. Pat. No. 3,309,461 issued on Mar. 14, 1967 to S. Deutsch and U.S. Pat. No. 3,342,937 issued on Sept. 19, 1967 to S. Deutsch use a pseudorandom sampling technique that allows the use of slow frame rates without the flicker effect one would ordinarily get with slow frame rates. More recently U.S. Pat. No. 3,769,452 issued on Oct. 30, 1973 to R. Stone expands on the Deutsch patent by making the pseudo-random technique compatible with normal fast scan television such as the NTSC standard television signal.

The principal disadvantages of the pseudo-random sampling technique are the poor resolution and intensity of the picture resulting from the small pinpoint samples that are projected onto the video screen. Additionally, the pseudo-random sampling pattern appears to crawl down the screen and detracts from the picture being displayed. Also, the picture quality is noticeably poorer than that of normal broadcast television and thus is unsuitable for use as its replacement.

BRIEF SUMMARY OF THE INVENTION

It is therefore one object of the present invention to provide an improved system of video data transmission at reduced bandwidths.

It is another object of the present invention to provide such an improved system wherein it is unnecessary to resort to any type of pseudo-random sampling.

It is further object of the present invention to provide such an improved system in which the quality and resolution of the transmitted picture can be made indistinguishable from that of standard television pictures.

It is yet another object of the present invention to provide such an improved system in which the implementation of the sampling circuitry is simple and straightforward.

It is still another object of the present invention to provide such an improved system in which different temporal data compression ratios can be selected at will.

The objects of the present invention are achieved by a picture transmission system for transmitting a video signal of compressed bandwidth in which the transmitting station is provided with sampling means for dividing a picture to be transmitted into a plurality of blocks containing a checkerboard pattern of picture elements and regularly sampling video signals along corresponding diagonal rows of picture elements in the respective blocks, and means responsive to the output of the sampling circuitry for transmitting the sampled video signals of one frame at a reduced bandwidth over a communication channel; and in which the receiving station is provided with a frame memory for temporarily storing transmitted video signals of one frame, and means for pla;ying back the video signals of one frame at the original high bandwidth frequency.

The picture transmission system of this invention is characterized in that a video signal such as the standard television signal is sampled at a rate that will determine the new data rate. Each sample is held until the next sample is taken. Since the sampling rate is well below the video information rate, the sampled data can be transmitted over a much narrower bandwidth channel. For digital data transmission, the transmission bandwidth can be made equal to the digital data rate. Since this inventin is not limited to digital transmission, the data can be transmitted in analog at a bandwidth that is approximately one-half the sampling rate. The receiver is so designed that it is synchronized with the sampling rate at the transmitter. The received samples are stored in a memory that has a capacity to store one full frame of video information. The memory is designed to store each sample and display it on a video monitor with the exact time relationship it had with the other samples taken at the transmitter. The sampling at the transmitter is done in such manner that all picture elements in the picture are sampled before a re-sampling of the picture takes place.

The foregoing as well as other objects, features and advantages of the present invention will become more apparent from the following detailed description taken in conjunction with the appended drawings.

DESCRIPTION OF THE PREFERED EMBODIMENT

Figure 1:
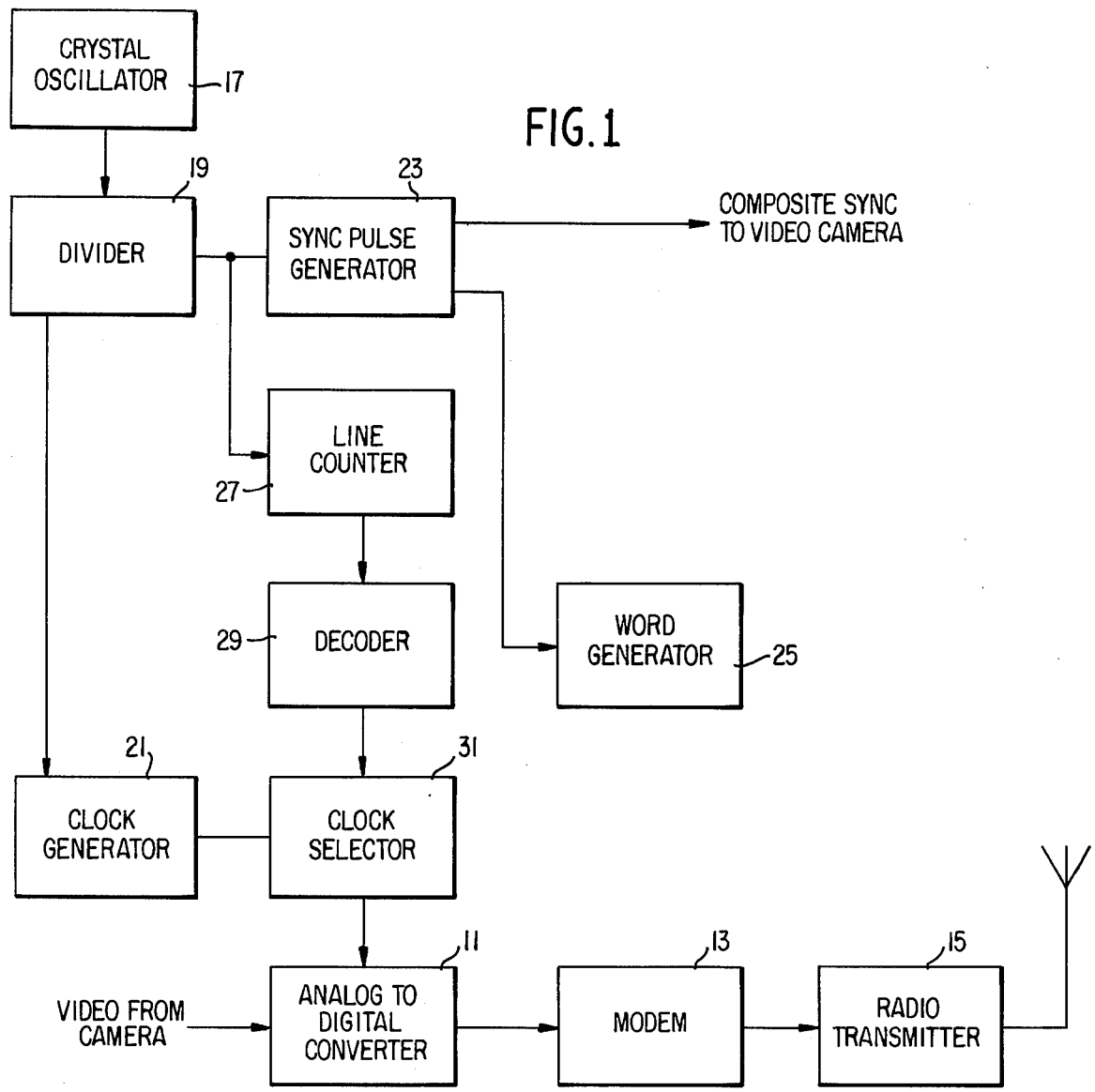
FIG. 1 is a block diagram showing the transmitting station of this invention.

Referring now to the drawings, and more particularly to FIG. 1, there is illustrated in block form a transmitting station of a video picture transmission system in accordance with the invention. In the transmitting station, the picture elements of a video signal from a video camera (not shown) are scan converted, a line at a time, by a 6-bit analog-to-digital converter 11 into digitally encoded signals.

The video camera provides a conventional relatively wide-bandwidth video signal having a given line rate (typically 15,75 KHz corresponding to the scan of a 525-line high frame at a rate of 30 frames per second).

For conventional wide-bandwidth transmission, the analog-to-digital converter 11 can be operated at a sampling rate of 8.064 MHz, which will be referred to as the video information rate, which is 512 times the line rate, to produce a re-constituted video signal having the standard 512 picture elements in each horizontal scanning line, and resulting in a complete picture frame having a total of 512 times 525 picture elements. As specified in accordance with the invention, however, the 6bit analog-to-digital converter 11 samples the video signal at a low frequency sampling rate which is an integral fraction of the video information rate of 8.064 MHz to produce a series of digital pulses which can be transmitted at a reduced bandwidth. This latter signal embodies a temporally compressed portion of the video signal resulting in a re-constituted video signal having a fraction of the standard 512 picture elements in each horizontal scanning line. The digital signals thus obtained are supplied to a modem 13 by means of which they are modulated on the carrier of a radio taransmitter 15 and transmitted over an appropriate communications channel to the receiving station where the above described process is reversed to play back the sampled video signal at the original high bandwidth video information rate.

A stable crystal oscillator 17 is the origin of all synchronizing and sampling signals. The output of the crystal oscillator 17 is divided to 8.064 KHz by a divider 19 to provide the video information rate signal. The video information rate signal is fed to a clock generator 21 and to the convert command input of the 6-bit analog-to-digital converter 11. The divider 19 also divides the output of the crystal oscillator 17 to 15.75 KHz to provide a timing signal at the standard video line frequency. This timing signal is fed to a sync pulse generator 23. The sync pulse generator produces horizontal and vertical synchronizing pulses to control the line and frame scanning speed of the video camera. The synchronizing pulse controlling the frame scanning speed is fed to a word generator 25 for use in forming a vertical synchronization word. The word generator output is supplied to the modem 13 by means of which it is modulated on the carrier of the radio transmitter 15 during the verical blanking time of a video monitor at the receiving staiton. A re-cycling binary line counter 27 is also clocked by the 15.75 KHz timing signal. The line counter 27 feeds a 1 of N binary-to -decimal decoder 29 wherein N is determined in accordance with the temporal compression ratio N : 1 to be achieved. Typical values of N are 16, 8, and 4. Each time the line counter 27 changes, a different decoder output $n$ lying in the range 1 to N is selected for a period of one video line. In the clock generator 21, the video information rate signal provided by the divider 19 is used to clock a re-circulating shift register which generates N clock phases all at a frequency 1/N of the frequency of the video information rate signal and all equally shifted in phase from each other. The re-circulating shift register can, for example, consist of a series of D flip-flops which have their Q outputs tied to the D input of the following flip-flop except for the last flip-flop which has its $\overline{Q}$ output tied to the D input of the first flip-flop. Clocking at 8.064 MHz the flip-flops toggle at the rate of (8.064/N) MHz. The clock phases thus obtained are supplied to a clock selector 31. In response to the selection of the nth output of the decoder 29, the clock selector selects the nth clock phase and feeds it into the storage command input of the 6-bit analog-to-digital converter 11 for a time period of one video line so that (512/N) equally spaced picture elements of the video line starting with the nth picture element are sampled at a low frequency sampling rate of (8.064/N) MHz, held until the next sample is taken, and digitally encoded to achieve a temporal compression ration of N : 1.

Figure 2:
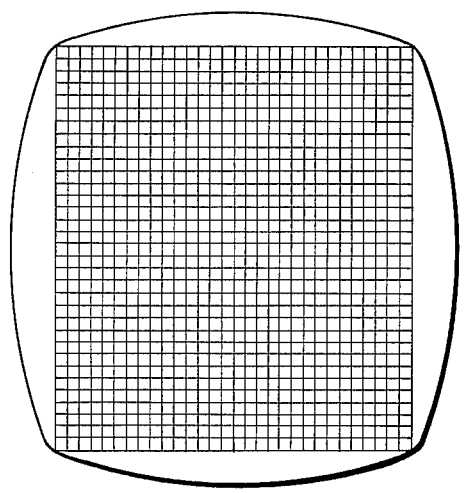
FIGS. 2 and 3 are diagrams for explaining the operation of this invention.
Figure 3:
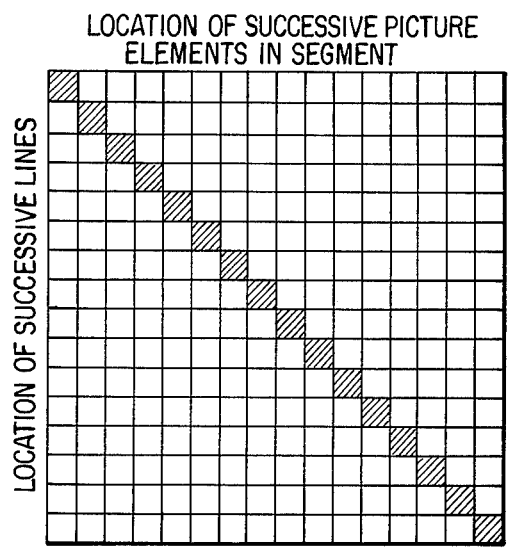

Referring to FIG. 2, the result of this clocking scheme is illustrated. FIG. 2 represents a standard video frame 525 lines high and 512 picture elements wide. The sampling is done by dividing the video frame into picture element blocks, each containing a checkerboard pattern of N times N picture elements. One such block is illustrated in FIG. 3. This division results in (512/N) segments of picture elements for each line scan. The selection of the nth clock phase for delivery to the storage command input of the analog-to-digital converter for a time period of one video line results in nth picture element in each of the (512/N) segments being sampled during the time period of the video line. The stepping of the line counter causes the selection of the $(n+1)$ th clock phase and results in the $(n+1)$ th picture element in the next line of each of the (512/N) segments being sampled during the time period of the next video line scan. This process is continued until all N clock pulses have been utilized; the cycle then repeats itself.

In FIG. 3, the darkened squares indicate the picture elements in one of the N times N picture element blocks sampled by this method during a representative scan frame. This mode of sampling results in the regular sampling of video signals along corresponding diagonal rows of picture elements in the respective blocks. Let it be assumed that the 525 lines of the video frame is not an even mulitple of N. The stepping of the line counter 27 causes this pattern to shift vertically in successive first scans so that the apparent random sampling pattern represented by FIG. 3 ultimately (that is, in N scanned frames) covers ever picture element just once.

Figure 4:
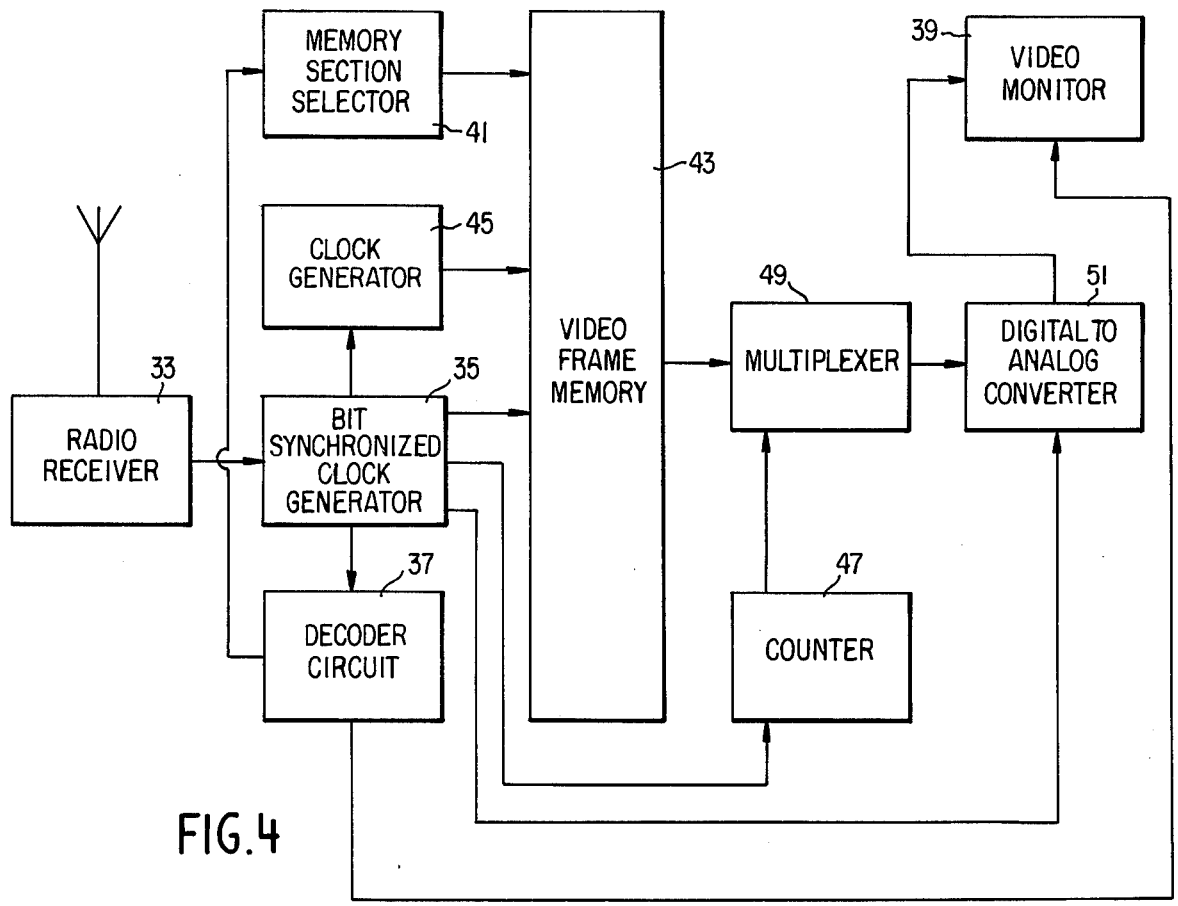
FIG. 4 is a block diagram showing the receiving station of this invention.

FIG. 4 depicts in block form a receiving station in accordanace with the invention. In the receiving station, the low frequency demodulated signals from the radio receiver 33 are passed through a bit synchronized clock generator circuit 35. This circuit generates a 15.75 KHz timing signal (at the standard video line frequency) and an 8.064 MHz video information rate signal, both synchronized with the incoming digital data signals. A decoder circuit 37 detects the vertical synchronization word and combines it with the 15.75 KHz timing signal to produce a synchronizing signal for the video monitor 39 and for a memory section selector circuit 41. This synchronizing signal controls the line and frame scanning speed of the video monitor 39. The memory section selector circuit 41 routes the incoming 6bit digital data embodying the extracted video signals onto one or more of the input lines of a video frame memory 43, Each section of the video frame memory comprises six simultaneously controllable recirculating shift registers to constitute a 6-bit parallel in, parallel out, recirculating picture element shift register. The number of memory sections equals the largest useful value of N, for example, 16. The 8.064 MHz video information rate signal is fed to a clock generator 45 which generates as many clock phases as memory sections, each at a freqency corresponding to that of the video information rate signal divided by the largest useful value of N and all equally shifted in phase from each other. The clock phases thus obtained are used to clock the video frame memory 43, one phase for each section of memory. Each memory section recirculates the stored picture element data at the smallest useful sampling rate frequency for a period of one video frame, until the stored picture element data is replaced by incoming data corresponding to a new frame. Thus, a complete frame of digitally encoded picture element samples is stored in the video frame memory 43 during the scan time of one frame. As will be discussed below, for a temporal compression ratio corresponding to the largest useful value of N, the memory section selector circuit 41 routes the incoming digital data from a video line into a single memory section, the data for consecutive lines being routed into consecutive memory sections. For a temporal compression ratio which is half that value, the memory section selector circuit 41 routes the two-fold increased digital data from each video line obtained by sampling the picture elements at twice the smallest useful sampling rate frequency into two of the memory sections whose clock frequencies are equally shifted in phase from each other. Although two sections are enabled in this case, different data, i.e., from alternately sampled picture elements, is clocked into each section since each section is clocked by a different clock phase. For a temporal compression ratio which is one quarter of the largest useful value of N, the memory section selector circuit 41 routes the 4-fold increased digital data from each video line into four of the memory sections whose clock frequencies are equally shifted in phase from each other. The memory section selector circuit 41 can comprise a recycling binary line counter clocked by the 15.75 KHz timing signal and feeding the address lines of one or more demultiplexors coupled to the input lines of the video frame memory 43. For a temporal compresssion ratio corresponding to the largest useful value of N, one demultiplexor routes the data into consecutive sections of the memory. For a temporal compression ratio corresponding to half that value, two demultiplexors, each coupled to a separate half of the memory can be operated in parallel so that two sections are enabled for every video line time. For a temporal compression ratio which is one quarter of that value, four demultiplexors, each coupled to a separate quarter of the memory, can be operated in parallel so that four sections are enabled for every video line time. A recycling binary counter 47, clocked by the 8.064 MHz video information rate signal provided by the bit synchronized-clock generator circuit 35, feeds the input select line of a multiplexor 49 coupled to the output lines of the video frame memory 43. The multiplexor selects consecutive sections of the memory at the video information rate and transmits the selected picture element data at the original high bandwidth frequency to a 6-bit digital-to-analog converter 51. The digital-to-analog converter, also clocked by the 8.064 MHz video information rate signal, accepts the 6-bit encoded digital data and translates it into an analog voltage. The analog voltage is fed to the video moniter 39 where the sampled video signal is played back in the exact time relationship with which it was sampled.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A picture transmission system for transmitting a video signal of compressed bandwidth over a communications channel and for receiving and processing the transmitted video signal, said picture transmission system comprising:
   a transmitting station including:
      sampling means for dividing a picture frame into a plurality of blocks containing a checkerboard pattern of picture elements and regularly sampling video signals along corresponsing diagonal rows of picture elements in the respective blocks;
      means responsive to the output of said sampling means for transmitting the sampled video signals of one picture frame at a reduced bandwidth over a communications channel;
   a receiving station including:
      a frame memory for temporarily storing transmitted video signals of one picture frame; and
      play-back means responsive to the output of said frame memory for playing back the video signals of one picture frame at the original high bandwidth frequency.

2. The picture transmission system recited in claim 1 wherein said sampling means includes an analog-to-digital converter, and said playback means includes a digital-to-analog converter.

3. The picture transmission system recited in claim 1 wherein said transmitting means includes a modem.

4. The picture transmission system recited in claim 1 wherein said frame memory includes a plurality of groups of simultaneously controllable re-circulating shift registers.

5. A picture transmission system for transmitting a video signal of compressed bandwidth over a communications channel and for receiving and procesing the transmitted video signal, said picture transmission system comprising:
   a transmitting station including:
      sampling means for dividing a picture frame into a plurality of blocks containing a checkerboard pattern of N times N picture elements where N is an integer determined in accordance with the temporal compression ratio N : 1 to be achieved, and regularly sampling video signals along corresponding diagonal rows of picture elements in the respective blocks;
      means responsive to the output of said sampling means for transmitting the sampled video signals of one picture frame at a reduced bandwidth over a communications channel;
   a receiving station including:
      a frame memory for temporarily storing transmitted video signals of one picture frame; and
      play-back means responsive to the output of said frame memory for playing back the video signals of one picture frame at the original high bandwidth frequency.

6. The picture transmission system recited in claim 5 wherein N is 16.

7. The picture transmission system recited in claim 5 wherein N is 8.

8. The picture transmission system recited in claim 5 wherein N is 4.

9. The method of transmitting a video signal of compressed bandwidth over a communications channel and receiving and processing the transmitted signal, comprising:
dividing a picture frame into a plurality of blocks containing a checkerboard pattern of picture elements;
sampling video signals along corresponding diagonal rows of picture elements in the respective blocks;
transmitting the sampled video signals of one picture frame at a reduced bandwidth over a communications channel;
receiving the transmitted video signals of one picture frame from the communications channel;
storing temporarily the transmitted video signals of one picture frame; and
playing back the video signals of one picture frame at the original high bandwidth frequency.

* * * * *